United States Patent [19]

Meiners

[11] 4,159,833
[45] Jul. 3, 1979

[54] WIDE RANGE BUMPER MOUNTED HITCH WITH SHOCK ABSORBER ATTACHMENT FOR TOW VEHICLE

[75] Inventor: Elmo R. Meiners, Anchor, Ill.

[73] Assignee: M & W Gear Company, Gibson City, Ill.

[21] Appl. No.: 871,390

[22] Filed: Jan. 23, 1978

[51] Int. Cl.² ............................................. B60D 1/00
[52] U.S. Cl. ........................... 280/478 R; 267/138; 280/487; 280/491 D; 293/117
[58] Field of Search ........... 280/491 D, 491 B, 491 R, 280/478 R, 487; 267/138, 139; 293/69 R, 69 V, DIG. 5

[56] References Cited

U.S. PATENT DOCUMENTS

| 2,050,093 | 8/1936 | Goldman | 280/487 |
| 2,783,039 | 2/1957 | Wilson | 267/138 |
| 3,904,225 | 9/1975 | George | 280/478 R |
| 4,060,255 | 11/1977 | Zimmerman | 280/491 D |

FOREIGN PATENT DOCUMENTS 936934 8/1948 France ....................................... 280/487

Primary Examiner—John A. Pekar

[57] ABSTRACT

An elongated horizontal channel member is mounted by means of a dual spring shock absorber in transverse position on one end of a towing vehicle. A pair of horizontal support arms have a first pair of corresponding ends pivotally mounted on the channel member for shifting along the channel member and swinging relative to the channel member about upstanding axes shiftable along the channel member with the first pair of arm ends between first outwardly convergent positions and second substantially aligned positions generally paralleling the channel member with the first pair of arm ends disposed remote from each other and the second other pair of arm ends disposed adjacent each other. A hitch member is provided to which the second other pair of ends of the arms are pivotally secured for angular displacement about upstanding axes and the hitch member and the channel member include coacting releasable lock structure operative to lock the hitch member in position relative to the channel member when the arms are disposed in the second positions. Further, the channel member and the first pair of ends of the arms include coacting structure whereby the arms and the hitch member supported from the second pair of arm ends will be automatically positioned, along the channel member, in predetermined position when the arms are swung from the first positions to the second position.

3 Claims, 9 Drawing Figures

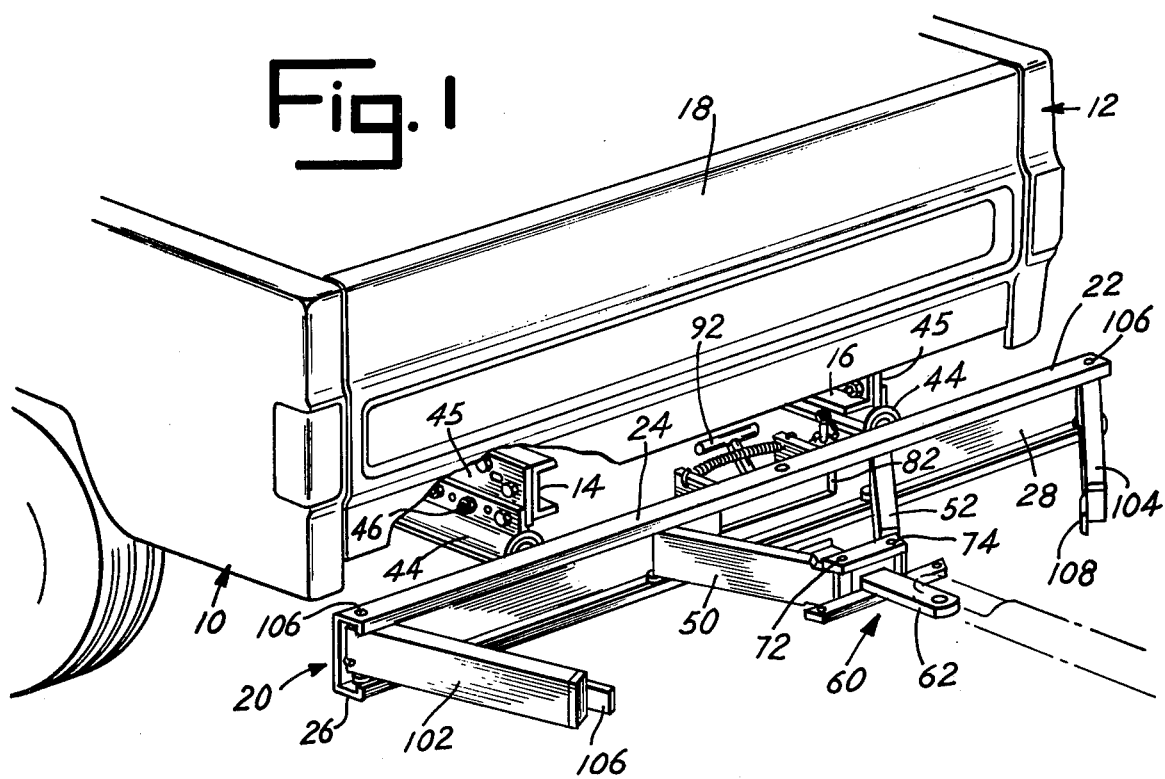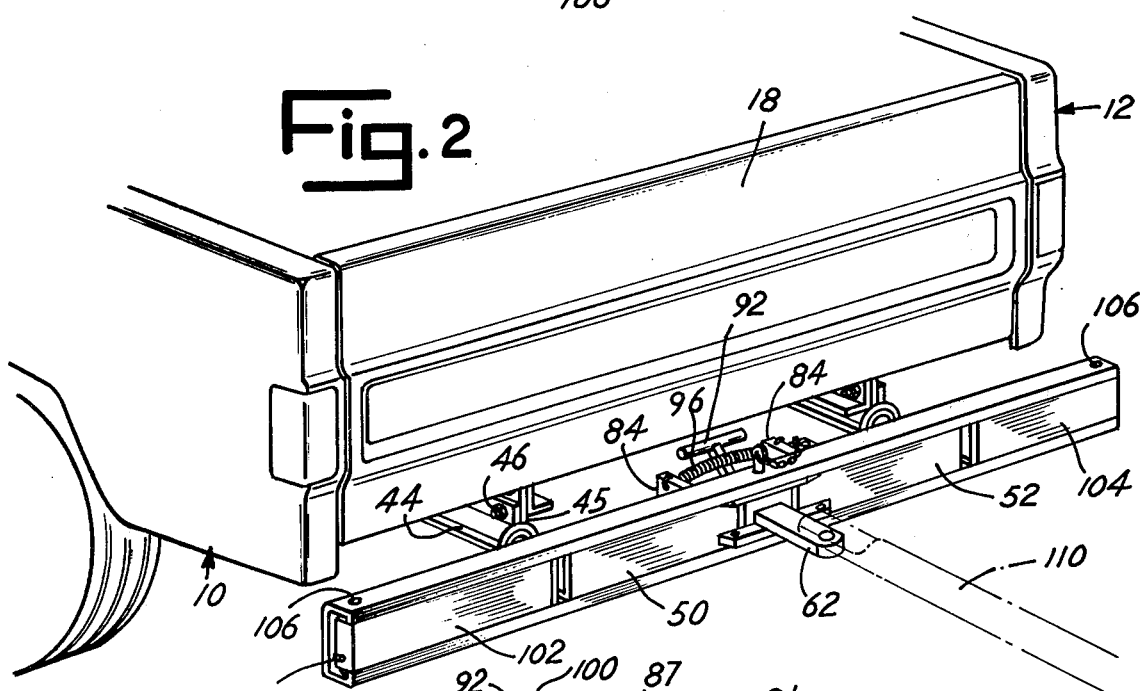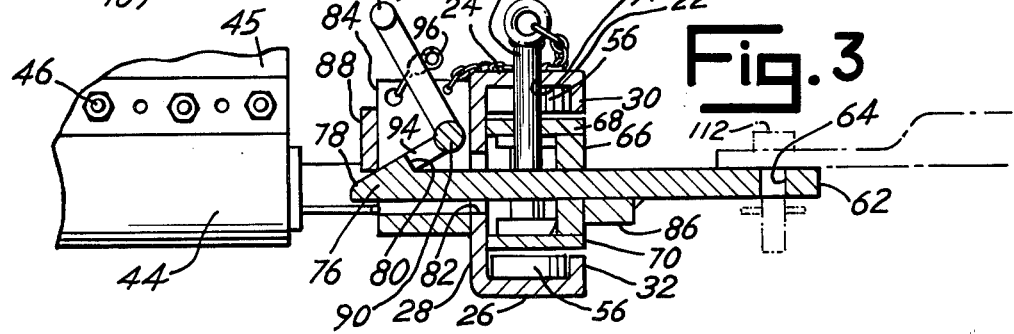

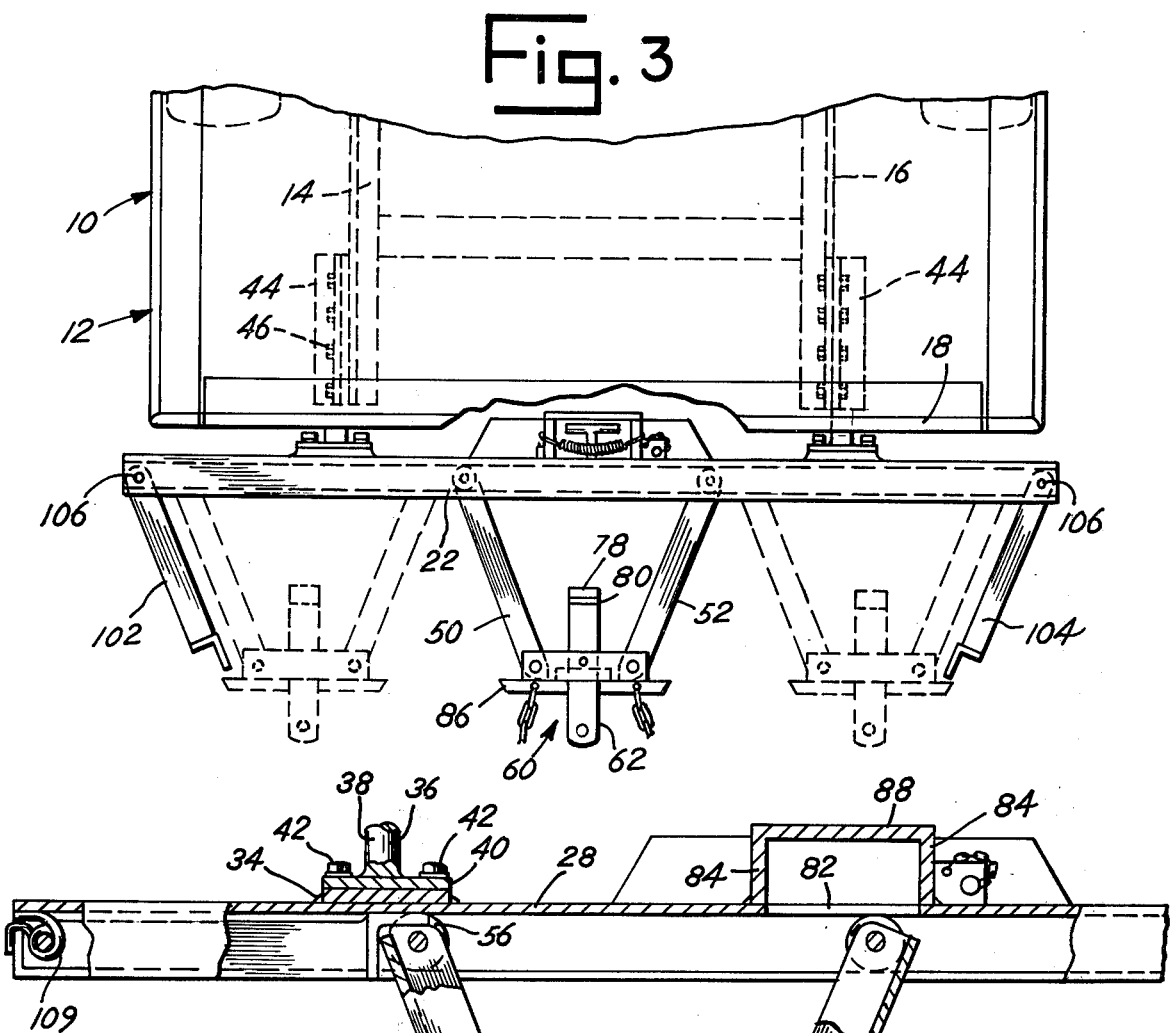

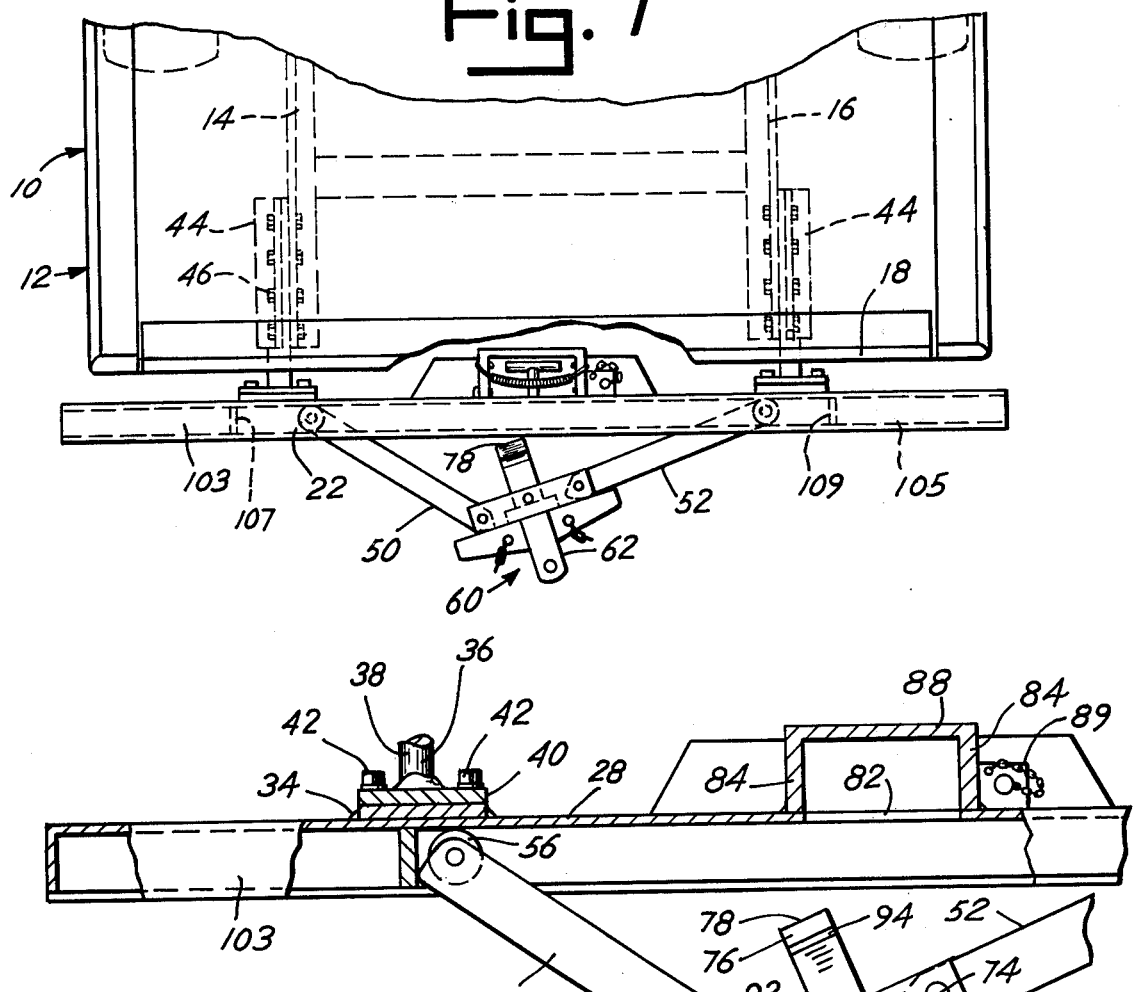
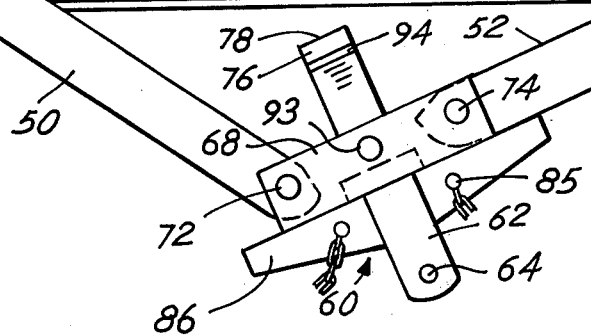
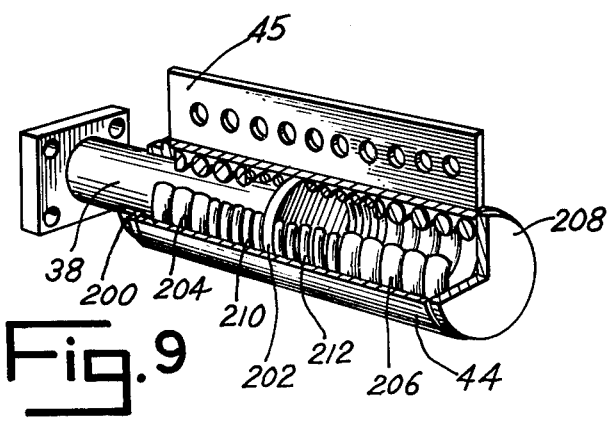

WIDE RANGE BUMPER MOUNTED HITCH WITH SHOCK ABSORBER ATTACHMENT FOR TOW VEHICLE

BACKGROUND OF THE INVENTION

Various forms of wide range bumper mounted hitches have been heretofore designed for the purpose of easing the task of hitching a towing vehicle to a towed vehicle. However, most wide range tow hitches either require special mounting structure or are not of a substantially fully retractable type.

Examples of previously patented tow hitches including some of the general structural and operational features of the instant invention are disclosed in U.S. Pat. Nos. 3,147,027, 3,419,285, 3,666,121, 2,704,900, 3,774,949 and 3,794,355.

Additionally, application Ser. No. 667,375 filed Mar. 16, 1976 for a Wide Range Bumper Mounted Hitch, now U.S. Pat. No. 4,060,255, discloses a bumper structure which was improved by the present invention. U.S. Pat. No. 4,060,255 (Ser. No. 667,375) is incorporated herewith by reference.

The referenced Wide Range Bumper Mounted Hitch works quite well. Hitching of a loaded wagon to the referenced bumper hitch results in ease of hitching and transport of the wagon. When the wagon is empty, however, the movement of the wagon tends to cause shock transfer through the bumper hitch to the towing vehicle. Positioning of a damping spring between the bumper hitch and the towing vehicle did not solve the shock problem. The present invention provides a solution to the shock difficulties encountered as well as providing other improvements to the original invention of U.S. Pat. No. 4,060,255 (Ser. No. 667,375).

SUMMARY OF THE INVENTION

The improved wide range hitch of the present invention is basically in the form of an elongated horizontal channel or bumper member and may be used in lieu of a conventional bumper. The hitch includes a rearwardly extendable and laterally shiftable hitch member slidably positioned in the bumper member. Connection of a vehicle to be towed via the hitch member is more readily accomplished and the rearwardly extendable hitch member may be thereafter forwardly retracted toward and releasably locked in a predetermined position in the bumper member. In addition, the elongated bumper defining horizontal channel member of the wide range tow hitch includes mounting structure therefor whereby the base member may be supported from opposite side rail ends of a vehicle chassis frame in an improved shock absorbing manner.

It is thus an object of this invention to provide a wide range tow hitch including a rearwardly extendable and laterally displaceable hitch member for easing the task in coupling a vehicle to be towed to the hitch member.

Another object of this invention, in accordance with the immediately preceding object, is to provide a tow hitch including a rearwardly extendable and lateral shiftable hitch member which may automatically be locked in predetermined position upon forward retracting of the rearwardly extendable hitch member.

Another object of this invention is to provide a wide range tow hitch with mounting structure therefor whereby the tow hitch may be supported from the frame rails of an associated vehicle in a shock absorbing manner and with the tow hitch being operable to serve the function of a bumper.

Yet another object of this invention is to provide a tow hitch in accordance with the preceding objects and which may be readily adapted for use on various different motor vehicles.

A further object of this invention is to provide a wide range tow hitch in accordance with the preceding objects and which will conform to conventional forms of manufacture, be of simple construction and easy to use so as to provide a device that will be economically feasible, long lasting and relatively trouble free in operation.

Still a further object of the invention is to provide an improved bumper which incorporates a shock absorbing mounting feature which accommodates various load conditions.

Another object is to provide a locking mechanism for the hitch member.

These together with other objects and advantages which will become subseqently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

In the description which follows, reference will be made to the drawing wherein:

FIG. 1 is a fragmentary rear perspective view of a pickup truck with the improved wide range tow hitch assembly mounted on the truck in lieu of the conventional rear bumper, the hitch member of the tow hitch being illustrated in a rearwardly displaced position for wide range shifting;

FIG. 2 is a fragmentary perspective view similar to FIG. 1 but with the rearwardly extendable and laterally shiftable hitch member in the forwardly retracted towing position;

FIG. 3 is a fragmentary top plan view of the assemblage illustrated in FIG. 1 and with alternate wide range positions of the hitch element being illustrated in phantom lines;

FIG. 4 is a fragmentary top plan view of the right hand end portion of the tow hitch with the wide ranging hitch element thereof illustrated in an intermediate shifted position to the left and with parts of the hitch being broken away and illustrated in horizontal section;

FIG. 5 is a fragmentary vertical sectional view taken substantially upon the plane indicated by the section line 5—5 of FIG. 2;

FIG. 6 is a fragmentary vertical sectional view taken substantially upon the plane indicated by the section line 6—6 of FIG. 2;

FIG. 7 is a fragmentary top plan view similar to FIG. 3 wherein an alternative preferred embodiment is depicted including the improved shock absorber feature of the invention;

FIG. 8 is a fragmentary top plan view similar to FIG. 4 wherein the alignment and locking mechanism of the invention is illustrated; and FIG. 9 is a fragmentary sectional view of the shock absorber portion of the invention.

DETAILED DESCRIPTION OF THE PREFERRED EMBODIMENT

Referring now more specifically to the drawings, the numeral 10 generally designates a vehicle in the form of a pickup truck. The pickup truck 10 includes the usual load bed 12 supported from the opposite side longitudinal frame rails 14 and 16 of the chassis of the pickup truck 10. The rear of the load bed 12 is closed by means of the usual tail gate 18.

The improved wide range tow hitch of the instant invention is referred to in general by the reference numeral 20 and includes an elongated C-shaped channel member 22 defining a base member. The channel member 22 includes upper and lower flanges 24 and 26 interconnected along one pair of corresponding edge portions by means of an upstanding vertical flange 28 extending and secured therebetween. The longitudinal marginal edges of the flanges 24 and 26 remote from the flange 28 terminate in downwardly and upwardly directed vertically aligned flanges 30 and 32 whose free edges are disposed in vertically spaced relation.

Opposite end portions of the flange 28 have a pair of mounting plates 34 secured thereto and the free end portion 36 of a piston rod 38 is equipped with a mounting plate 40 secured to each mounting plate 34 by means of fastener 42. The piston rods 38 are slidingly telescopingly received in mounting cylinder portions 44 secured to the frame rails or members 14 and 16 by means of universal mounting plates 45 and fasteners 46. It will of course be noted that the piston rods 38 and mounting cylinder portions 44 are parallel and extend longitudinally of the vehicle 10.

Compression springs as shown in FIG. 9 are disposed in each mounting cylinder portion 44 and yieldingly bias the piston rods 38 to its rearmost displaced positions thereof illustrated in FIGS. 1 through 5. The compression springs yieldingly resist forward shifting of the piston rods 38 within the mounting cylinder portions 44. The specific construction and arrangement of the springs particularly in combination with the remainder of the bumper construction constitutes the invention.

Referring to FIG. 9, the cylinder 44 receives the rod 38. Rod 38 is received through end bushing 200. Bushing 200 has a diameter which is less than the internal diameter of the cylinder 44. A flange plate 202 is attached to the interior end of rod 38. Plate 202 has substantially the same diameter as the internal diameter of cylinder 44 and may move longitudinally within the cylinder 44. Heavy duty springs 204 and 206 are positioned at the opposite ends of cylinder 44. Spring 204 fits over the rod 38 and is retained within cylinder 44 by the bushing 200. Spring 206 is retained in the compartment of cylinder 44 defined between flange 202 and end plate 208.

Light duty springs 210 and 212 are positioned on opposite side of the flange 202 between heavy duty springs 204 and 206 respectively and flange 202. Springs 210 and 212 have a low spring constant relative to springs 204 and 206. Thus, springs 210 and 212 compress to absorb jolts from light loads, for example, an unloaded wagon. Heavier loads totally compress the small springs 210 and 212 in which event the heavy duty springs 204 and 206 cushion the load. The springs preferably all have a uniform diameter slightly less than the internal diameter of the cylinder 44. Also, the light duty springs 210, 212 are substantially identical as are the heavy duty springs 204, 206.

Use of the special spring construction described permits practical use of the bumper construction. Heretofore, a single spring was used which provided a bumper comstruction that did not have load damping for various loads. Thus, a single heavy duty spring was found to result in undesirable light load reaction. The present invention in the combination described overcomes the prior deficiencies.

The hitch 20 includes a pair of channel-shaped support arms 50 and 52 including axle pins 54 secured through one pair of corresponding ends thereof. The ends of the axle pins 54 have wheels 56 journaled thereon and each pair of wheels 56 is captively received between the flanges 30 and 32 and the opposing portions of the flange 28. In this manner, the ends of the support arms 50 and 52 provided with the wheels 56 may shift longitudinally of the channel member 22 and also swing relative to the latter about the center axes of the axle pins 54.

The hitch 20 further includes a hitch member referred to in general by the reference numeral 60 and the latter includes an elongated hitch element 62 which is horizontally disposed and extends longitudinally of the vehicle 10. The hitch element 62 is apertured at its rear end as at 64 extends through and is secured to an upstanding plate 66. The plate 66 is welded to the hitch element 62 centrally intermediate the opposite ends of the element 66 and upper and lower horizontal flanges 68 and 70 are secured to and project rearwardly from the upper and lower marginal portions of the plate 66. The ends of the support arms 50 and 52 remote from the axle pins 54 are pivotally supported beween corresponding ends of the plates 68 and 70 as at 72 and 74 and the hitch element 62 projects forwardly of the plate 66 and terminates in a barb type end portion 76 including a forwardly and upwardly facing cam surface 78 and a rearwardly and upwardly facing abutment surface 80.

The central portion of the flange 28 has an opening 82 formed therethrough and a pair of rearwardly projecting upstanding plates 84 are secured to and project rearwardly from the flange 28 on opposite sides of the opening 82.

The hitch member 60 further includes a horizontal transverse abutment bar 86 secured to the underside of the hitch element 62 and the lower portion of the rear face of the plate 66. The forward end of the hitch element 62 is projectable rearwardly through the opening 82 and rearward penetration of the hitch element 62 through the opening 82 is limited by engagement of the opposite ends of the bar 86 with the adjacent ends of the support arms 52 when the latter are in the forwardly retracted substantially aligned positions illustrated in FIG. 2 of the drawings.

A locking pin 87 is normally retained in a pin holder 89 in FIG. 8. When the hitch member 60 is in the closed position, the locking pin 87 is inserted through opening 91 in channel member 22 and opening 93 in flange 68. The pin 87 thus assists in retention of the hitch member 60 in the closed position. Pin 87 is an improved safety feature of the invention.

A strap member 88 extends between and is secured to the upper portions of the rear marginal edges of the plates 84 and thereby braces the latter. Further, a pivot shaft 90 is journaled between the plates 84 and includes an upwardly projecting T-shaped handle 92. In addition, the pivot shaft 90 includes a radially outwardly projecting abutment flange 94 and an elongated expansion spring 96 extends between and is connected to the plates 84. The spring 96 engages the handle 92 to bias the upper portion of the handle 92 in a forward direction.

Upon rearward insertion of the rear end of the hitch element 62 through the opening 82 the cam surface 78 abuts the flange 94 so as to cam the handle 92 in the direction of the arrow 100 in FIG. 5. Thus, the upper portion of the cam surface 78 passes beneath the free end of the flange 94 as the opposite ends of the bar 86 abut the adjacent ends of the arms 50 and 52. Thereafter, the tension of the spring 96 swings the handle 92 in a direction opposite to the arrow 100 so as to swing the abutment flange 94 downward behind the abutment surface 80 so as to prevent rearward displacement of the hitch element 62 relative to the channel member 22.

A pair of arms 102 and 104 have one pair of corresponding ends thereof pivotally supported from the opposite ends of the channel member 22 between the flanges 30 and 32 by means of pivot fasteners 106. The arms 102 and 104 are thus horizontally swingable and may be angularly displaced between positions substantially paralleling the channel member 22 and retracted in the opposite ends thereof (see FIG. 2) and rearwardly projecting positions such as these illustrated in FIGS. 1 and 3. The free ends of the arms 102 and 104 include locking flanges 106 and 108 which are closely abutted against the inner surface of the flange 28 when the arms 102 and 104 are swung to the positions thereof illustrated in FIGS. 2 and 3. Furthermore, the free ends of the arms 50 and 52 overlie the flanges 106 and 108 when the arms 102 are swung to the positions thereof illustrated in FIG. 2 and the hitch member 60 is forwardly retracted to the position thereof illustrated in FIG. 5 thereby retaining the arms 102 and 104 in the retracted positions. Also, the arms 102 and 104 are spring biased to the retracted positions thereof by means of springs 109.

As illustrated in FIGS. 7 and 8, an alternative embodiment eliminates the swingable arms 102 and 104. In lieu thereof, channel end members 103 and 105 are welded in the channel member 22. The end members 103 and 105 include stop plates 107 and 109 which are spaced sufficiently to receive the hitch member 60 in the closed position. Thus, when the hitch member 60 is closed, a smooth outside bumper surface is formed.

In operation, when it is desired to rearwardly extend the hitch member 60, pin 87 is removed and placed in storage pin holder 89. The handle 92 is pulled forwardly in the direction of the arrow 100 so as to elevate the abutment flange 94 above the abutment surface 80 after which the hitch member 60 may be rearwardly extended so as to withdraw the forward barbed end 76 of the hitch element 72 from the opening 82. As the hitch member 60 is rearwardly extended, the arms 50 and 52 swing from the retracted position thereof illustrated in FIG. 2 to the extended positions illustrated in FIGS. 1, 3 and 4. Thereafter, the arms 102 and 104 may be swung to the open positions thereof illustrated in FIGS. 1 and 3. The hitch member 60 may then be shifted longitudinally of the channel member 22 between the phantom and solid line positions thereof illustrated in FIG. 3.

After the forward end portion of a trailer tongue 110 or the like has been coupled to the hitch element 62 by means of any suitable fastener 112, the vehicle 10 may be moved forward slightly in a manner to ensure that the hitch member 60 is generally centered relative to the channel member 22. Thereafter, the arms 102 and 104 may be swung to the retracted positions thereof and the vehicle 10 may be operated in reverse thereby causing the hitch member 60 to be rearwardly displaced relative to the channel member 22. As the hitch member 60 is rearwardly displaced the roller or wheel-equipped ends of the arms 50 and 52 will move apart along the channel member 22 and abut the adjacent ends of the arms 102 and 104 and ride over the outer sides of the flanges 106 and 108. In addition, the forward end of the hitch element 62 will be forwardly projected through the opening 82 and the cam surface 78 will engage the flange 94 so as to cam the latter upwardly out of the way until such time as the spring 96 may swing the handle in a counterclockwise direction as illustrated in FIG. 5 of the drawings to again swing the flange 94 downwardly behind the abutment surface 80 thereby locking the hitch member 60 in the forwardly retracted position.

FIGS. 7 and 8 illustrate the manner in which the flange 94 is always directed toward the opening 82. The abutment bars 86 engage and limit rotational movement of the associated pivot arm 50, 52, during the closing operation. As such, the bars 86 provide a very important function of guiding the flange 94 regardless of the reverse manner or direction in which the vehicle is made to move during the hitching operation. Note that the bars 86 also include openings 85 for attachment of chains between the bumper construction and the towed vehicle. This is another improved safety feature.

When the arms 50, 52, 102 and 104 are in the positions thereof illustrated in FIG. 2 of the drawings the abutting engagement of the remote ends of the arms 50 and 52 with the adjacent ends of the arms 102 and 104 prevent lateral shifting of the hitch member 60 relative to the vehicle 10 along the channel member 22. Of course, inasmuch as the piston rods 38 are spring mounted from the mounting cylinder portions 44 the entire wide range tow hitch 20 functions as a shock absorbing bumper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:
1. An improved tow bar for vehicles comprising,
 (a) a horizontal base member with an inside and an outside, said outside including an elongated horizontal channel;
 (b) first and second horizontal pivot arms, each arm having an outside and an inside end, said arms slidably and pivotally mounted at their outside ends in the channel;
 (c) hitch means pivotally connected to the inside ends of the pivot arms;
 (d) releasable latch means in the base member for engaging and holding the hitch means in fixed position relative to the channel; and
 (e) abutment means at the opposite ends of the channel to maintain the slidable pivot arms and hitch means in the channel; and
the improvement comprising in combination:
 (f) means for attaching the base member to a vehicle, said means including shock absorbing means said shock absorbing means including:
  (i) a cylinder for attachment to the vehicle;
  (ii) a rod attached to the base member and projecting into the cylinder;
  (iii) a transverse flange plate attached to the end of the rod within the cylinder, said plate being longitudinally slideable in the cylinder; and

(iv) four compression coil springs within the cylinder, said springs having a substantially constant diameter slightly less than the internal diameter of the cylinder, two of said springs having spring constants less than the other two springs, one each of said springs of lesser spring constant and one of said springs of greater spring constant being positioned on opposite sides of the flange plate in opposed relation with each other and intermediate one end of the cylinder and the flange plate, whereby the force absorbed by said spring is a summation of forces dependent upon spring constants.

2. The two bar of claim 1 wherein the low spring constant springs abut the flange plate interposed therebetween.

3. The tow bar of claim 1 including a removable locking pin for cooperatively engaging the base member and hitch means simultaneously when the hitch means is in the fixed position relative to the channel.